United States Patent Office 2,973,751
Patented Mar. 7, 1961

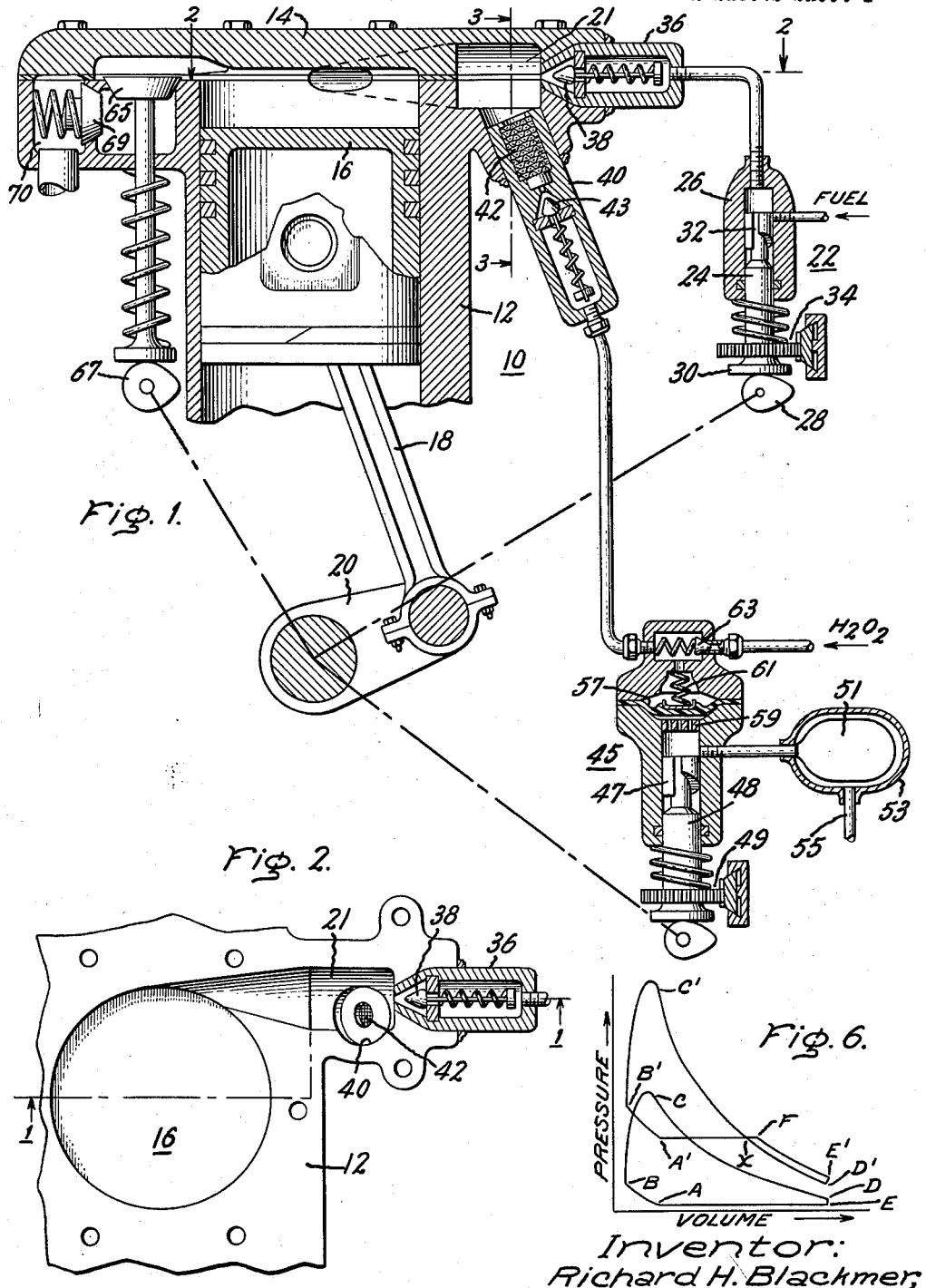

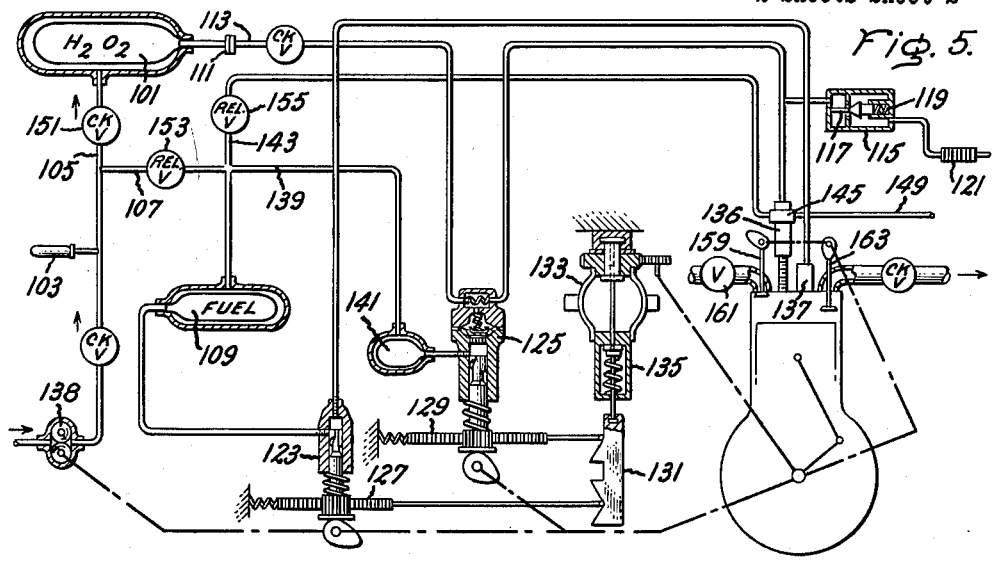

2,973,751
INTERNAL COMBUSTION ENGINE
Richard H. Blackmer, Schenectady, N.Y., assignor to General Electric Company, a corporation of New York
Filed Dec. 14, 1956, Ser. No. 628,953
3 Claims. (Cl. 123—39)

This invention relates generally to internal combustion engines and more particularly to internal combustion engines of reciprocating type fueled with a hydrocarbon or other oxygen combustible fuel and supplied with an oxygen liberating composition such as hydrogen peroxide which supplements or completely supplants atmospheric air supply of oxygen for combustion of the fuel.

It has long been recognized that oxygen liberating compositions such as hydrogen peroxide present attractive possibilities for use in both internal and external combustion engines, in an engine cycle in which the peroxide constitutes an oxidizing agent for an oxygen combustible fuel such as a hydrocarbon fuel, alcohol, hydrazine and the like. Engines utilizing such fuel-peroxide mixtures offer particular advantage for submarine and torpedo propulsion, extreme altitude aircraft and other applications wherein atmospheric air supply is unavailable or inadequate to meet engine oxygen requirements. In addition to their freedom from reliance on atmospheric air supply, fuel-peroxide engines also afford such desirable operating characteristics as high power-to-weight ratio, low specific fuel consumption and absence of toxic combustion products, all of which engine characteristics enhance desirability of use in applications such as those just enumerated. However, as heretofore constructed these engines have been subject to certain difficulties complicating their design and operation, and effectively limiting successful service utilization.

In these known engines of external combustion type, hydrogen peroxide is thermally or catalytically decomposed and its products of decomposition brought into contact with an oxygen combustible fuel in a combustion chamber, the resultant gases of combustion then being valved directly to an engine of reciprocating or turbine type. These systems are subject to a number of important disadvantages chief among which is the extreme difficulty of accurately controlling fuel proportions and combustion chamber pressures. Also, the possibility of explosion due to mixing of undecomposed peroxide and fuel in the combustion chamber cannot easily be eliminated in engines of this type.

In addition to the reciprocating engine cycle just described, wherein peroxide decomposition and fuel combustion both are external to the engine cylinders, a number of other reciprocating engine cycles have previously been proposed. Among these is an arrangement in which peroxide is decomposed in an external reactor and its products of decomposition fed into the engine intake manifold either alone or in combination with atmospheric air. Such systems suffer from the disadvantage that much of the decomposition energy of the peroxide is lost before reaching the engine. Moreover, systems of this type tend to excessive size and complexity, and since the engine requires a normal compression stroke it cannot be operated with high exhaust counterpressure such as experienced in torpedo and submarine propulsion applications.

Another and more successful approach involves timed injection of liquid peroxide directly into the engine cylinders, the peroxide being thermally decomposed by the residual hot gases from the previous engine cycle. Fuel then is injected and combusts with the peroxide decomposition products. While this engine provides very low specific fuel consumption and high power-to-weight ratio, it too has suffered from important disadvantages as heretofore constructed. The engine must be started and run for a time on atmospheric air, in order to raise the engine cylinder to a temperature at which the peroxide when injected will immediately be thermally decomposed. Otherwise, undecomposed peroxide could mix with fuel in the cold engine and an explosion would ensue. The engine also requires a compression stroke with fairly high compression ratio, in order to pressurize the residual gases sufficiently to raise their temperature to the point necessary to assure immediate decomposition of the peroxide when injected into the gases. Operation with high exhaust counterpressure accordingly is not feasible in engines of this type.

The present invention has as its principal object the provision of new and improved internal combustion engines and methods of operating such engines wherein the fuel is combusted with decomposition products of an oxygen liberating composition, which engines are not subject to the foregoing and other disadvantages of prior engines utilizing these combustion materials.

It is a further object of the invention to provide an internal combustion engine of reciprocating type wherein a catalytically decomposable peroxide is passed through catalytic reactor means directly into the engine cylinder in a manner to optimize power-to-weight ratio, minimize specific fuel consumption, and afford maximum safety and reliability of operation.

Another object of the invention is the provision of a reciprocating internal combustion engine which requires no atmospheric oxygen supply either during starting or during normal operation, but which if desired may be made to operate on atmospheric air supply. Still another object is the provision of a reciprocating internal combustion engine which requires no compression stroke and therefore is capable of operation with high exhaust counterpressures such as encountered in torpedo and submarine propulsion applications.

It is also an object of the invention to provide means for adapting reciprocating internal combustion engines of conventional type to operation on a fuel-peroxide combustion cycle not requiring atmospheric air supply, with minimum alteration to the engine and without detriment to its continuing ability to operate on its original air cycle when desired.

In carrying out the invention in one form, there is provided a reciprocating internal combustion engine including means for injecting an oxygen combustible fuel into the engine cylinder or cylinders just prior to each engine power stroke. In timed relation to this fuel injection, a charge of catalytically decomposable peroxide is fed through a catalytic reactor connected to discharge directly into the engine cylinder in a manner such that the peroxide decomposition products intermix with the injected fuel. Combustion then occurs and expansion of the resulting combustion gases drives the engine piston through its power stroke. For service applications wherein atmospheric air supply is available, provision may when desired be made to permit alternative use of peroxide or atmospheric air, or both together.

Since in the engines of the invention the fuel and peroxide both are directly injected under pressure into the cylinder, no compression stroke is required and the engine may be easily cranked for starting and successfully operated even with high exhaust counterpressures. The engine cycle fully utilizes all the heat of decomposition of the peroxide, and thus affords maximum power-to-weight ratio and minimum specific fuel consumption. At the same time, the possibility of formation of explosive fuel-peroxide mixtures is effectively minimized by the catalytic reactor through which the peroxide must pass before it can enter the engine and come into contact with fuel therein.

My invention will be more fully understood and its various objects, features and advantages further appreciated by reference to the appended claims and the following detailed specification when read in conjunction with the accompanying drawings, wherein:

Figure 1 illustrates diagrammatically a reciprocating internal combustion engine and accessory apparatus in accordance with the invention, the engine being shown partially in section taken on the line 1—1 in Figure 2;

Figure 2 is a section taken substantially along the line 2—2 in Figure 1;

Figure 3 is a section taken substantially along the line 3—3 in Figure 1;

Figure 4 is a sectional view of a modified form of peroxide injector assembly;

Figure 5 illustrates schematically a fuel-peroxide supply and control system suitable for use with the engine of Figure 1; and Figure 6 is a graph illustrating pressure-volume cycles in engines operating in accordance with principles of the invention.

With continued reference to the drawings, wherein like reference numerals have been used throughout to designate like elements, an internal combustion engine in accordance with the invention is designated generally by reference numeral 10 in Figure 1. The cylinder 12, cylinder head 14, piston 16, connecting rod 18 and crank shaft 20 of the engine 10 all may be of generally conventional configuration except that the cylinder and head preferably are shaped to form a pre-combustion chamber 21 as hereinafter more fully described.

An oxygen combustible fuel is supplied to engine 10 by a fuel pump 22 which as illustrated is of the cam-shaft driven, positive displacement type commonly used in diesel engines for fuel injection. Pump 22 comprises a plunger 24 reciprocable within a cylinder 26 by an engine driven cam 28 engaging a cam follower 30 carried on the lower end of the pump plunger. The upper end of plunger 24 is provided with a conventional metering groove structure 32 which varies the effective length of the plunger stroke and the quantity of fuel delivered on each stroke, depending on the angular position of the plunger 24. Any suitable means such as the rack and pinion 34 illustrated may be provided for effecting the necessary adjustment of the angular position of plunger 24, to thus control pump output in well-known manner.

Pump 22 supplies fuel to engine 10 through a fuel injector assembly 36 which may include a spring-loaded check valve 38 of conventional type capable of operation against combustion chamber pressures. The injector 36 is arranged to discharge fuel either directly into the upper end of the engine cylinder or, preferably, into a pre-combustion chamber 21 opening into the cylinder as shown. A second injector assembly 40 serves to inject peroxide into pre-combustion chamber 21 for initiating and supporting combustion of the fuel supplied thereto.

The pre-combustion chamber 21 if used should be constructed and arranged to cause thorough mixing of the fuel and peroxide, to thus assure complete combustion. As best shown in Figures 1-3, such thorough mixing action may be obtained by disposing the peroxide injector off-center with respect to the fuel injector, so that the peroxide decomposition products enter the pre-combustion chamber tangentially and the fuel is injected down the center of the resultant swirl. Combustion is initiated immediately on mixing of the peroxide decomposition products with the fuel, and the burning mixture then passes into the engine cylinder proper.

In order to thus initiate combustion, and to preclude the possibility of undecomposed peroxide mixing with fuel in pre-combustion chamber 21 or in the engine cylinder, catalytic reactor means 42 are provided in the peroxide injector 40 through which the peroxide must pass before entering the pre-combustion chamber. This reactor 42 preferably is disposed as directly adjacent the engine cylinder as possible so as to preserve all the available energy of decomposition of the peroxide, for purposes of fuel ignition and improved engine efficiency.

The catalytic reactor 42 should be effective to catalytically decompose all peroxide which passes through it even at low temperatures as during engine starting, and it must also be capable of withstanding the extremes of temperature and pressure to which it will be subjected in service. To these ends, the reactor preferably comprises alternate layers of stainless steel screening, which provide the necessary high temperature strength, and alternating therewith, layers of a suitable catalytic material such as silver screening. Preferably, the silver catalyst screen is given a porous silver plating to increase surface area, and may also be surface impregnated with samarium nitrate to improve its catalytic qualities in known manner.

Another preferred catalytic material is cobalt coated iron screening. Effectiveness of such screening may be improved by use of radioactive cobalt, since decomposition of peroxide can be initiated and accelerated by atomic radiation. Examples of other possible catalyst materials are platinum and permanganates of calcium and sodium. in granular or other suitable form.

The peroxide injector assembly 40 further includes a check valve 43 for preventing backflow in the peroxide supply line. This valve may be of generally conventional construction as shown, except that all its parts are fabricated of materials compatible with the peroxide to minimize corrosion thereby. Among suitable peroxide-resistant materials are a number of soft austenitic stainless steels, such, for example, as that known as AISI Series 300. It will be noted that since the valve design shown includes no sliding bearing surfaces, long service life may be attained despite the use of relatively soft steels in fabricating the valve.

The corrosive nature of peroxides also leads to difficulties in design and control of pumping elements for pressurizing the supply of peroxide to the engine. In accordance with the invention, these difficulties may effectively be obviated by use of a two-stage pump as shown at 45 in Figure 1. The first stage of this pump comprises a cam-driven positive displacement pump 47 generally similar to the fuel pump 22 already described, having its plunger 48 rotated in like manner by rack and pinion means 49 to vary the effective stroke. This first stage pump is supplied with pumping fluid from a small reservoir 51 fabricated of an elastic material or otherwise made expansible to accommodate pulsation of the contained fluid. If desired, this reservoir and the fluid within it may be initially pressurized or "supercharged" by fluid pressure supplied an enclosing tank 53 through conduit 55 as hereinafter explained with reference to Figure 5.

This first stage pump 47 drives a second stage pumping unit of diaphragm type including a flexible diaphragm 57 as shown. Diaphragm 57 oscillates within a pumping chamber closed on its lower side by a perforated disk 59 which limits downward movement of the diaphragm, upward movement thereof being controlled by a spring 61. A spring-loaded check valve 63 in the upper portion of the pump housing cooperates with the injector check valve 43 to control movement of peroxide into and out of the diaphragm pumping chamber.

To prevent any possibility of formation of an explosive mixture in event of rupture of diaphragm 57, the fluid used in the first stage pump 47 preferably is an inert one such, for example, as the fluoride polymers widely sold under the trade names "Kel-F" and "Fluorolube." The pump diaphragm 57 itself should be of a material compatible with peroxide; polyethylene and "Teflon" being particularly satisfactory for the purpose. The materials of which the other pump parts are made should also be resistant to peroxide corrosion and therefore preferably are made of soft stainless steel as already described with reference to the peroxide injector assembly 40.

The output of the diaphragm stage of pumping unit 45 is accurately dependent on the output of the first stage pump 47, which in turn is dependent on the angular position to which its plunger is set by rack and pinion 49. Very accurate control of peroxide flow rate is thus afforded, and at the same time long service life and maximum reliability of operation may be realized by reason of the fact the peroxide cannot come into contact with the first stage plunger type pump to cause corrosion thereof.

As shown, the engine is provided with an exhaust valve 65 of poppet type operated in conventional manner by cam shaft means 67. Since as explained above the engines of the invention are adapted to operate with no compression stroke and against high exhaust counterpressures, a second exhaust valve 69 may be provided to prevent reverse flow through the exhaust system in applications wherein external pressures may exceed that within the engine cylinder at any time during the engine cycle. This second exhaust valve if used may be a simple check valve as shown, adapted to open and permit flow into the exhaust manifold 70 and spring loaded to close to prevent reverse flow into the engine cylinder.

In operation, both peroxide and fuel are injected into the engine at the beginning of each power stroke, the peroxide being fed through the catalytic reactor 42 and there completely decomposed into steam and oxygen at high temperature. The decomposition energy of the peroxide, plus the thermal energy released by combustion of fuel in the hot oxygen-rich products of decomposition, combine to drive the engine piston on its power stroke. When the piston approaches bottom dead center, exhaust valve 65 opens to vent the cylinder through check valve 69 to atmosphere, after which the cycle repeats. It will be noted that when operating on this cycle the engine requires no compression stroke either for the purpose of air intake or of pressurizing the cylinder gases so as to raise the temperature thereof to the ignition point. Since no compression stroke is necessary the engine may easily be cranked by a relatively small starting motor and may operate against high exhaust counterpressures as hereinbefore explained.

While other concentrations may be used, hydrogen peroxide is widely available commercially in 90% solution in water and this concentration has been found fully satisfactory for use in engines operating in accordance with the invention.

Referring now to Figure 4, a modified form of peroxide injector assembly 72 is illustrated. As shown, this injector assembly comprises catalytic reactor means 74 including alternating layers of stainless steel or like screening and a catalyst material as hereinbefore described with reference to Figure 1. The injector assembly further includes a check valve unit comprising a valve member 76 urged against its seat 78 by a spring 80 compressed between split retainer rings 82 and 83 engaging the stem of valve member 76 and its seat 78, respectively. One or more split spacer rings 85 may be inserted between retainer ring 83 and valve seat 78 as necessary to adjust the operating point of the valve.

The valve unit is held in the injector body 87 by a threaded gland 89 the inner end of which bears against the valve seat 78. The injector body 87, gland 89 and valve seat 78 together define an annular coolant chamber 91 provided with inlet and outlet fittings 93 and 95 as shown. Cooling water flow through this chamber 91 serves to prevent any thermal decomposition of liquid peroxide upstream of the reactor 74 which might be caused by heat transfer either from the reactor or from the engine. This arrangement also is of advantage in that any peroxide leakage around the valve seat 78 is into the cooling water flow, where it can do no damage.

In Figure 5, a complete fuel-peroxide supply system including engine speed control and fail-safe means is schematically illustrated. Initially, the entire peroxide supply system, excepting only the peroxide tank 101, is filled with water. The system is primed with peroxide at starting by mechanically or electrically firing a $CO_2$ or like priming cartridge 103 connected into the pressurizing lines 105 and 107 leading to the outer shell of the peroxide tank 101 and to the outer shell of the fuel tank 109, respectively. The inner shells of these tanks 101 and 109 are of polyethylene or like flexible material collapsible to expel the tank contents on application of external pressure.

A rupture disk 111 in the peroxide line 113 breaks under the $CO_2$ pressure, and peroxide from tank 101 then purges the storage water out of the system through a priming dump valve 115. When peroxide reaches this dump valve, the peroxide is catalytically decomposed by a low melting silver alloy link 117 which holds the dump valve open against its spring 119. The heat of decomposition at the fusible link 117 will melt the link almost instantly and close the dump valve. As a safety precaution, any peroxide that escapes through the dump valve is made to pass through a small catalytic reactor 121 where it is decomposed and thus rendered safe.

The fuel pump 123 and peroxide pump 125 are controlled by rack and pinion means 127 and 129, respectively, both of which are spring loaded against a cam member 131 variably positioned by a speed governor 133 shown of fly-ball type. Governor 133 includes a lost motion connection 135 permitting the cam member 131 to be pulled downwardly against the action of the governor at starting. The cam member 131 is so shaped that when thus shifted to its starting position, the peroxide pump 125 is at maximum delivery setting while the fuel pump 123 is retarded to zero delivery setting.

After the peroxide system has been primed, and with the cam member 131 manually or otherwise moved to starting position (downwardly in Figure 5), the engine may be cranked as by a small electric starting motor until peroxide decomposition takes over. Normally two or three cycles are necessary to get the engine motoring on peroxide alone. After the engine has run a few moments on peroxide, the governor is permitted to take over and start fuel injection. The cam profiles then determine the fuel-peroxide ratios and flow rates to the peroxide injector 136 and fuel injector 137 necessary to establish and maintain desired engine speed.

Peroxide and fuel "supercharge" if desired may be provided by a small positive displacement water pump 138 once the engine is running. Water is delivered from this pump through line 105 to the outer shell of peroxide tank 101 and through line 107 to the outer shell of fuel tank 109. The water in line 107 branches off through a line 139 to pressurize the outer shell of the small tank 141 containing pumping fluid for the first stage of peroxide pump 125, and passes through a line 143 to the coolant chamber 145 surrounding the peroxide injector nozzle 136. The water then drains to sump through a line 149.

As shown, line 105 has a check valve 151 interposed therein, and lines 107 and 143 include relief valves 153 and 155, respectively. The relief valve 153 preferably is set to operate at higher pressure than relief valve 155, typical settings being 80 and 20 p.s.i., respectively. The pressure on the peroxide tank then is the sum of the pressure drops across the 80 p.s.i. and 20 p.s.i. relief valves while fuel tank pressure is only 20 p.s.i. The check valve 151 on the peroxide pressure inlet serves to prevent peroxide from getting into the fuel in event of peroxide tank leakage. Similarly, the 80 p.s.i. relief valve 153 serves to prevent fuel from entering the peroxide tank in event of fuel tank leakage. Preferably, the initial storage water in the peroxide tank outer shell has a suitable inhibitor in solution to passivate the peroxide in the event of tank leakage.

As previously explained, the engines of the invention may if desired be arranged for operation either with peroxide constituting the sole source of oxygen for combustion, or with this source supplemented or completely supplanted at times by atmospheric oxygen. To this end, the engine may include conventional air intake means as diagrammatically shown at 159 in Figure 5. The air-intake conduit includes a gate valve 161 which may be closed when the engine is to operate on peroxide and opened when it is to operate using atmospheric air supply. During operation in the latter mode, the peroxide supply may be either continued in reduced quantity or completely shut off. Where the engine is to operate on atmospheric air supply as an alternative or supplement to the peroxide supply, then of course a compression stroke is necessary and the engine exhaust valve 163 should be timed to close shortly after the piston passes bottom dead center as necessary to provide the desired compression ratio.

Engine pressure-volume cycles when operating on peroxide are illustrated graphically in Figure 6. With atmospheric exhaust pressure, the lower P—V cycle in Figure 6 applies. The exhaust valve closes during the upward stroke at A, preferably when the crank shaft is about 40° or so before top dead center. Between points A and B, peroxide and fuel are injected into the precombustion chamber, and peroxide decomposition and combustion occur between points B and C. The hot combustion gases expand during the power stroke between points C and D and the exhaust valve opens at D when the crank shaft is adjacent bottom dead center. The combustion gases then expand down to atmospheric pressure and the cylinder is exhausted as the piston moves between points E and A to complete the cycle.

With high exhaust counterpressure, the upper P—V cylinder in Figure 6 applies. As before, the exhaust valve closes during the exhaust stroke at A' and peroxide and fuel are injected during the remaining portion of the piston upward stroke A'—B'. Decomposition and combustion occur between points B' and C', and the combustion gases expand to D' as the piston moves to bottom dead center. Shaft output work is developed only during the C'—X portion of the expansion, because the cylinder pressure at X is equal to ambient pressure. In the X—D' portion of the cycle, work is done on the combustion gases at the expense of system kinetic energy. The exhaust valve opens at D' and the small volume of gases at exhaust pressure between the exhaust and check valves expands and mixes with the gases remaining in the cylinder. This increases the cylinder pressure to E', and work is now done on the piston as it moves upwardly from E' to F'. At F', cylinder gases are at ambient pressure and are forced out through the exhaust and check valves as the piston moves on to A'. The net work done during the cycle is the difference between the larger, positive work loop A'B'C'X and the smaller, negative work loop XD'E'F'.

While a number of specific embodiments of the invention have been shown and described, it should be understood that various other modifications may be made without departing from the invention. The appended claims are therefore intended to cover all such modifications as fall within the true spirit and scope of the invention.

What is claimed and desired to be secured by Letters Patent is:

1. In combination with an internal combustion engine including engine cylinder and piston means together defining an expansible chamber to which may be supplied an oxygen combustible fuel and a catalytically decomposable peroxide composition, means for periodically supplying fuel charges to said combustion chamber, peroxide supply means for injecting peroxide charges into said combustion chamber in timed relation to said fuel charges including injector body means mounted to said cylinder and opening directly into said combustion chamber, and a catalytic reactor unit disposed in said injector body in the path of peroxide flow therethrough including catalyst material operative to catalytically decompose the peroxide and discharge its decomposition products directly into said combustion chamber for initiating and supporting combustion of fuel therein, said injector body means including a coolant chamber disposed adjacent said peroxide flow path upstream of said reactor unit for reducing thermal decomposition of the peroxide.

2. In combination with an internal combustion engine including engine cylinder and piston means together defining an expansible combustion chamber, a precombustion chamber leading directly into said combustion chamber, means for periodically charging said precombustion chamber with an oxygen combustible fuel, means for injecting charges of a catalytically decomposable peroxide composition into said precombustion chamber in timed relation to said fuel charges including injector body means mounted to said cylinder and opening directly into said precombustion chamber, combustion chamber exhaust valve means operable to provide an engine compression ratio such that combustion chamber temperature as raised by compression may at times be below the temperature of thermal decomposition of the peroxide composition and including a check valve unit permitting only outward flow from said combustion chamber, and a catalytic reactor unit disposed in said injector body in the path of peroxide flow therethrough including catalyst material operative to catalytically decompose said peroxide charges and discharge the decomposition products thereof directly through said precombustion chamber into said combustion chamber to initiate and support combustion of fuel therein even at low initial combustion chamber temperatures as at engine starting.

3. An internal combustion engine adapted to operation on an oxygen combustible fuel and a catalytically decomposable peroxide composition, comprising engine cylinder and piston means together defining an expansible combustion chamber, a precombustion chamber leading directly into said combustion chamber, means defining an exhaust passage from said combustion chamber, engine actuated valve means interposed in said exhaust passage operable to delimit an engine power stroke and a compression stroke relatively short as compared to the power stroke, check valve means in said exhaust passage in series flow relation with said engine actuated valve means for preventing reverse flow through said passage into said combustion chamber, means for supplying a fuel charge to said precombustion chamber in timed relation to each engine power stroke, peroxide injector means including a catalytic reactor unit discharging directly into said precombustion chamber and containing catalyst material operative to catalytically decompose peroxide exposed thereto, said means for supplying a fuel charge and said peroxide injector means being axially offset leading into said precombustion chamber to provide swirling for improved mixing, and means for periodically supplying peroxide charges through said reactor unit for catalytic decomposition therein and discharge of the peroxide decomposition products directly through said precombustion chamber to there intermix with the fuel for initiating and supporting combustion in said combustion chamber.

References Cited in the file of this patent

UNITED STATES PATENTS

| | | |
|---|---|---|
| 1,343,536 | Weeks | June 15, 1920 |
| 2,499,642 | Hannum | Mar. 7, 1950 |
| 2,673,069 | Carpenter | Mar. 23, 1954 |
| 2,746,249 | Bichowsky et al. | May 22, 1956 |
| 2,775,961 | Petre | Jan. 1, 1957 |
| 2,791,883 | Moore | May 14, 1957 |
| 2,862,482 | Hart | Dec. 2, 1958 |